United States Patent
Kothinti Naresh et al.

(10) Patent No.: US 10,783,011 B2
(45) Date of Patent: Sep. 22, 2020

(54) DEADLOCK FREE RESOURCE MANAGEMENT IN BLOCK BASED COMPUTING ARCHITECTURES

(71) Applicant: QUALCOMM Incorporated, San Diego, CA (US)

(72) Inventors: Vignyan Reddy Kothinti Naresh, Morrisville, NC (US); Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 93 days.

(21) Appl. No.: 15/712,121

(22) Filed: Sep. 21, 2017

(65) Prior Publication Data

US 2019/0087241 A1    Mar. 21, 2019

(51) Int. Cl.
*G06F 9/52* (2006.01)

(52) U.S. Cl.
CPC ................... *G06F 9/524* (2013.01)

(58) Field of Classification Search
CPC ....................................................... G06F 9/524
See application file for complete search history.

(56) References Cited

U.S. PATENT DOCUMENTS

| | | | | |
|---|---|---|---|---|
| 6,144,982 A * | 11/2000 | Panwar | ................... | G06F 9/382 712/16 |
| 7,971,041 B2 | 6/2011 | Ramsey | | |
| 9,575,816 B2 | 2/2017 | Hooker et al. | | |
| 2003/0041228 A1 * | 2/2003 | Rosenbluth | ......... | G06F 9/30098 712/220 |
| 2008/0201716 A1 * | 8/2008 | Du | .......................... | G06F 9/382 718/104 |
| 2010/0169894 A1 | 7/2010 | Sheaffer et al. | | |
| 2013/0117758 A1 * | 5/2013 | Cuadra | ................. | G06F 9/5022 718/104 |
| 2013/0311999 A1 | 11/2013 | Fetterman; Michael et al. | | |
| 2014/0122844 A1 * | 5/2014 | Swanberg | ............. | G06F 9/3851 712/228 |
| 2016/0012010 A1 | 1/2016 | Ganapathy et al. | | |
| 2016/0179532 A1 * | 6/2016 | Wright | ................ | G06F 12/0875 711/125 |

(Continued)

OTHER PUBLICATIONS

Gonzalez A., et al., "Virtual-Physical Registers," Proceedings of the 4th International Symposium on High-Performance Computer Architecture, 1998, 10 pages.

*Primary Examiner* — Benjamin C Wu
(74) *Attorney, Agent, or Firm* — Muncy, Geissler, Olds & Lowe, P.C.

(57) ABSTRACT

Systems and methods are directed to efficient management of processor resources, particularly General Purpose Registers (GPRs), for example to minimize pipeline flushes prevent deadlocks by counting GPRs instead of allocating them to specific blocks of code. Blocks of code are allowed to execute if the Free GPRs count is adequate. The method contemplates counting the number of Register Writers in blocks of code which will write to GPRs which are in process of executing, and counting the GPRs which are available instead of merely allocating them to dedicated use by a block of code, or an instruction in a block of code. Because blocks do not run if there is not enough GPRs available for the block, deadlocks and pipeline flushes due to lack of resources can be minimized.

13 Claims, 6 Drawing Sheets

(56) References Cited

U.S. PATENT DOCUMENTS

2016/0217016 A1* 7/2016 Raman ................ G06F 9/52
2018/0210732 A1* 7/2018 Zhu ................ G06F 9/3851
2018/0275991 A1* 9/2018 Khorasani ............ G06F 9/5011

* cited by examiner

Figure 1

| Block# | Register Writers | Threshold |
|--------|------------------|-----------|
| 0 | 5 | 5 |
| 1 | 6 | 11 |
| 2 | 5 | 16 |
| 3 | 5 | 21 |
| 4 | 6 | 27 |
| 5 | 6 | 33 |
| 6 | 7 | 40 |
| 7 | 5 | 45 |

Number of General Purpose Registers

| Block# | Register Writers | Free GPRs |
|---|---|---|
| 0 | 5 | 32 |
| 1 | 6 | 27 |
| 2 | 5 | 21 |
| 3 | 5 | 16 |
| 4 | 6 | 11 |
| 5 | 6 | 10 |
| 6 | 7 | 10 |
| 7 | 5 | 3 |

DEADLOCK FREE RESOURCE MANAGEMENT IN BLOCK BASED COMPUTING ARCHITECTURES

FIELD OF DISCLOSURE

Disclosed aspects are directed to resource management in processing systems. More specifically, exemplary aspects are directed to management of General Purpose Registers to reduce deadlocks and pipeline flushes due to inadequate resources.

BACKGROUND

Typically in block based processor architectures a block of instructions are dispatched, in a block, for execution. An instruction block, or just block in this document, refers to a group of instructions. Block based Instruction Set Architectures (ISAs), such as the Cascade ISA, typically specify the maximum size of the block that should be supported by the hardware. Reservation Station (RSV) Array in this document refers to the unit in hardware that is used to hold the per instruction state and operands and the instruction block to be executed. The number of instruction slots in an RSV Array may match the maximum size of the ISA blocks or differ based on the microarchitecture and/or the software being executed. For example, the RSV Array could be smaller than the maximum block size defined by the ISA, while targeting the most likely size of a block in a given implementation. A block typically uses GPRs (General Purpose Registers) for computation and to receive results of computation. Multiple processor blocks can be in a state of execution in RSV Arrays at any one time. GPRs are finite resources and not having enough of them can cause deadlocks and pipeline flushes which will adversely affect processor performance.

A typical block oriented instruction set architecture, such as Cascade, may have multiple RSV Arrays in the processor with each RSV Array holding a block of code which is being executed. In some block-based architectures, completion is tracked by completion of register writes, stores and branch resolution. In presence of predication (e.g., interaction between instructions), dummy register writes and dummy stores to memory locations may be introduced into the code to update completion status of the block. Such dummy instructions are called Annulled instructions and need not execute in the sense that they perform no computation, thus do not need to use any resources.

Late allocation of key resources like General Purpose Registers (GPRs) can reduce the resource holding time by each instruction, which in turn reduces the resource pressure. However, late allocation techniques could cause potential pipeline deadlocks where older instructions do not have enough resources (e.g., GPRs) to complete when resources are occupied by younger instructions which only release them at commit time, when the younger instructions no longer need them. There are various deadlock detection and recovery mechanisms. For example younger instructions may be flushed when an older instruction does not have enough resources thereby freeing the resources, which the younger instructions have reserved, for use by the older instruction. While this can be relatively simple to implement, it could potentially have large negative performance impact as flushes are expensive in terms of performance.

Deadlock avoidance mechanisms are also proposed in the literature where a determined amount of resources are reserved for the oldest set of instructions, but such schemes may needlessly hold resources thereby slowing the execution of younger instructions.

Another mechanism to help deadlock avoidance due to lack of resources, is to delay the allocation of the resources until later in the execution of the instructions. This can have a downside also, since if the resources are allocated later there may be a shortage of resources when the actual execution of the instructions takes place.

Conservative speculation may also aid in deadlock prevention. Execution of deeper speculation may be delayed or limited in order to reduce resource pressure and make the resources available for use by other instructions.

Accordingly there is a need for additional and improved means of resource management in block based computer architectures to determine that a block of code that is to be executed has enough resources to execute (i.e., is ready to run or ready to execute) and has sufficient resources in order to avoid deadlocks and make efficient use of resources.

SUMMARY

Exemplary aspects of the invention are directed to systems and methods for resource management to prevent deadlocks. For example, disclosed systems and methods are directed to a method of resource management in a processing system having a block based architecture. The method includes determining a number of GPRs (General Purpose Registers) to be written by a block of code (Register Writers), determining a Threshold, wherein the Threshold is a number contained in a counter comprising the number of Register Writers of all blocks of code which are in the process of executing plus the number of Register Writers to be written by the block of code. Hereinafter the term "Register Writer" refers to an instruction in a block of code that may write to a GPR (General Purpose Register). The method further includes comparing, for example using a comaparator, the Threshold to a number representing the total number of GPRs present (Total General Purpose Registers); and determining that the block is ready to execute if the Threshold is equal to or less than the number of Total General Purpose Registers.

Further an aspect of resource management in a processing system having a block based architecture, includes determining the number of Register Writers in a block of code, determining the number of Free GPRs (General Purpose Registers); and determining that the block is ready to run if the number of Register Writers is equal to or less than the number of Free GPRs (General Purpose Registers).

Other aspects of the disclosed methods of resource management in a processing system having a block based architecture include determining the number of Register Writers of each block of code, calculating a Threshold Max for a block to be executed by setting the Threshold Max equal to the maximum number of Register Writers of all blocks in the process of executing older than the to be executed block, determining if a number of Free GPRs (General Purpose Registers) is greater than or equal to the Threshold Max plus one, and designating the to be executed block as ready to execute thereby allowing the to be executed block to execute.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
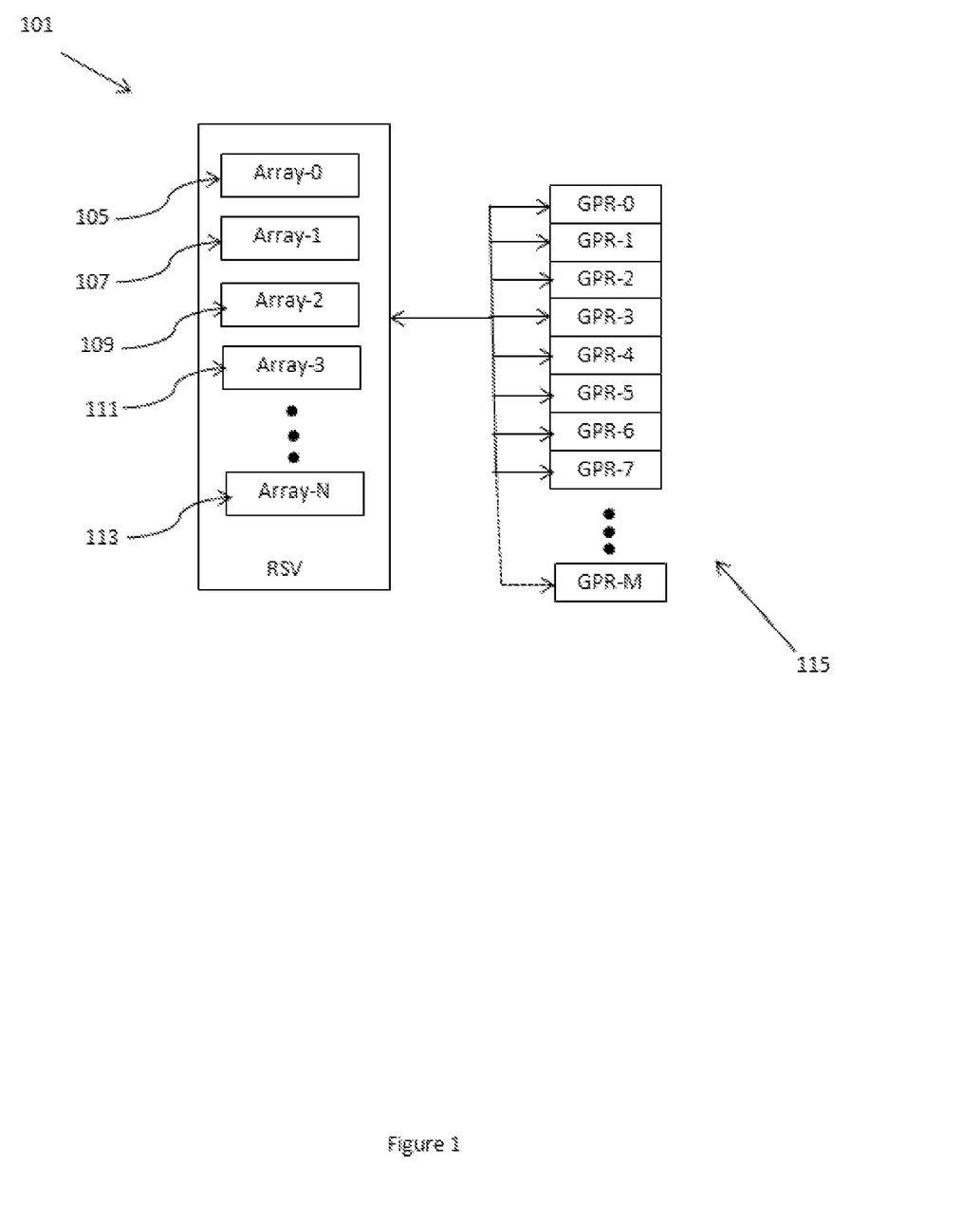
FIG. 1 is a graphical diagram of a RSV (Reservation Station) Array execution unit and the RSV Arrays within as well as their coupling to GPRs (General Purpose Registers).

FIG. 1 is a graphical diagram of a RSV (Reservation Station) Array execution unit and the RSV Arrays within, additionally illustrating coupling to GPRS. In FIG. 1 a Reservation Station (RSV) is generally depicted at 101. The Reservation Station 101 contains RSV Arrays 105, 107, 109, 111, and 113, which are also labeled Array-0, Array-1, Array-2, Array-3 and Array-N respectively. The term RSV Array, as used herein refers to a unit in hardware, a portion of a processor system, that is used to hold instructions to be executed, the per instruction state, operands and various flags associated with instructions. The RSV Arrays contain blocks of instructions, (blocks) which are placed in the RSV Arrays for execution. Block based ISAs (Instruction Set Architectures) typically specify the maximum size of the block that is supported by the architecture.

Typically RSV Arrays make use of GPRs (General Purpose Registers or just registers) illustrated generally at 115. GPRs are high speed registers that may be used by RSV Arrays for computations and to receive the results of computations. Typically all the RSV Arrays share the GPRs and when an instruction within an RSV Array needs a GPR, a GPR is allocated to that instruction. Once a GPR is allocated to an instruction it is unavailable to be used by another instruction until the instruction no longer needs that GPR and releases it. In the teachings herein another approach is taken. GPRs are reserved instead of being allocated. Those of skill in the art will recognize that, although the teachings herein are discussed with respect to GPRs it can be used equally well with other limited shared resources. Reservation does not explicitly specify which GPRs will be allocated for a particular block of instructions, but instead counts the number of GPRs that will be needed.

Figure 2:
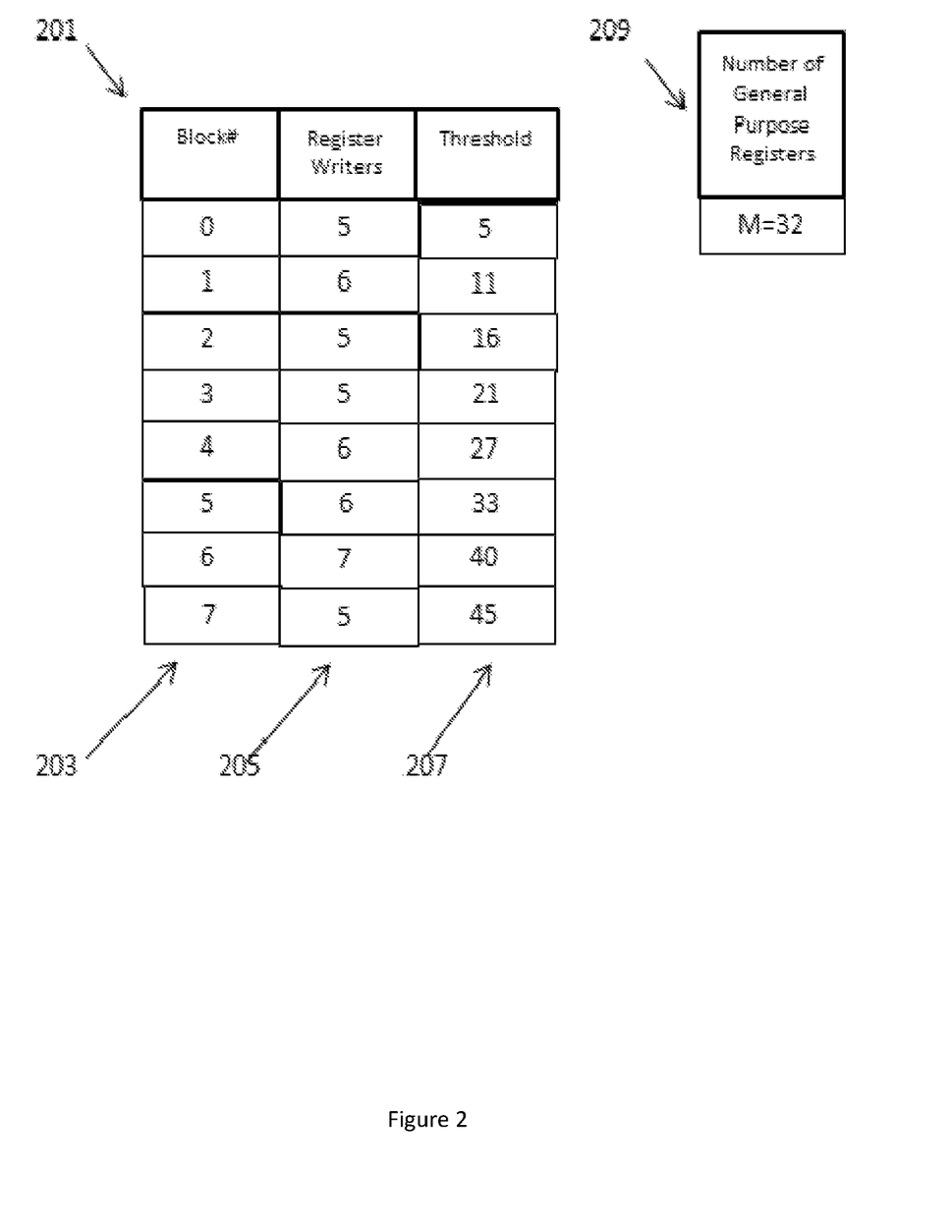
FIG. 2 is a graphic illustration of a table which is used to illustrate a first method of reserving GPR (General Purpose Registers) according to an aspect of the invention.

FIG. 2 is a graphic illustration of a table 201 which is used to illustrate a first method of reserving GPRs (General Purpose Registers), without allocating them, according to an aspect of the invention.

In FIG. 2, column 203 of table 201 represents differing blocks of code (Block#), which are to be executed, for example in an RSV Array (e.g., 101) as illustrated in FIG. 1. Column 205 of table 201 labeled "Register Writers" indicates how many General Purpose Registers may be written by instructions when the block of code, which appears in the same row of table 201 is executed. Column 207 of table 201 labeled "Threshold" represents the total number of GPRs each block of code listed in column 207 may use. The "Number of General Purpose Registers" (#GPRs) 209 is a total count of General Purpose Registers that are present. #GPRs is set to the maximum number of GPRs, which in the illustration in FIG. 1 is M+1 (GPR-0 through GPR M). For purposes of illustration, Number of General Purpose Registers (#GPRs) 209 is set to 32 because the GPR file, e.g. 115 of FIG. 1 illustratively comprises 32 GPRs.

Block 0 has 5 Register Writers, as seen in column 205. Once block 0 is allowed to execute, the Threshold in column 207 is incremented to 5 because block 0 can use 5 GPRs. The Threshold is compared to the number of Free GPRs, which is the total number of GPRs present minus the total number of Register Writers of all the executing blocks. The Threshold is equal to 5, which is less than 32, so block 0 can be allowed to execute.

Block 1 has 6 Register Writers as seen in column 205. The 5 GPRs from the block 0 row of table 201 are added to the 6 GPRs from block 1 of the table 201 and the Threshold becomes 11, which is less than the Number of General Purpose Registers (#GPRs) in 209, which is 32, so block 1 will be allowed to execute (as well as block 0).

Block 2 has 5 Register Writers as seen in column 205. The 5 GPRs from the block 0 row of table 201 are added to the 6 GPRs from the block 1 of the table 201 and the 5 GPRs from block 2 and the Threshold becomes 16, which is less than the Number of General Purpose Registers (#GPRs) 209, which is 32, so block 2 will be allowed to execute (as well as blocks 0 and 1).

Block 3 has 5 Register Writers as seen in column 205. The 5 GPRs from the block 0 row of table 201 are added to the 6 GPRs from block 1 of the table 201 and the 5 GPRs from block 2 and the 5 GPRs from block 3 and the Threshold becomes 21, which is less than the Number of General Purpose Registers (#GPRs) 209, which is 32, so block 3 will be allowed to execute (as well as blocks 0, 1 and 2).

Block 4 has 6 Register Writers as seen in column 205. The 5 GPRs from the block 0 row of table 201 are added to the 6 GPRs from block 1 of the table 201 and the 5 GPRs from block 2 and the 5 GPRs from block 3 and the 6 GPRs from block 4 and the Threshold becomes 27, which is less than the Number of General Purpose Registers (#GPRs) 209, which is 32, so block 4 will be allowed to execute (as well as blocks 0, 1, 2, and 3).

Block 5 has 6 Register Writers as seen in column 205. The 5 GPRs from the block 0 row of table 201 are added to the 6 GPRs from block 1 of the table 201 and the 5 GPRs from block 2 and the 5 GPRs from block 3 and the 6 GPRs from block 4, and the six GPRs from block 5 and the Threshold becomes 33, which is more than the Number of General Purpose Registers (#GPRs) 209, which is 32, so block 5 will not be allowed to execute until block 0, 1, 2, 3, or 4 completes thereby freeing up GPRs, the number of which will then be subtracted from the Threshold. So for example, if block 1 completes, its instructions will no longer need GPRs to write to and the 6 Register Writers from block 1 will be deducted from the Threshold, which will become 21. The 6 GPRs from block 5 will then be added to the Threshold, which will bring the Threshold up to 27. 27 is less than 32 (#GPRs), so block 5 will then be allowed to execute.

It should be noted that the Threshold column 207 is merely an illustrative device used to clarify aspects of the invention, however the Threshold will only need to be a counter that is incremented and decremented as blocks try to execute and other blocks complete.

Figure 3:
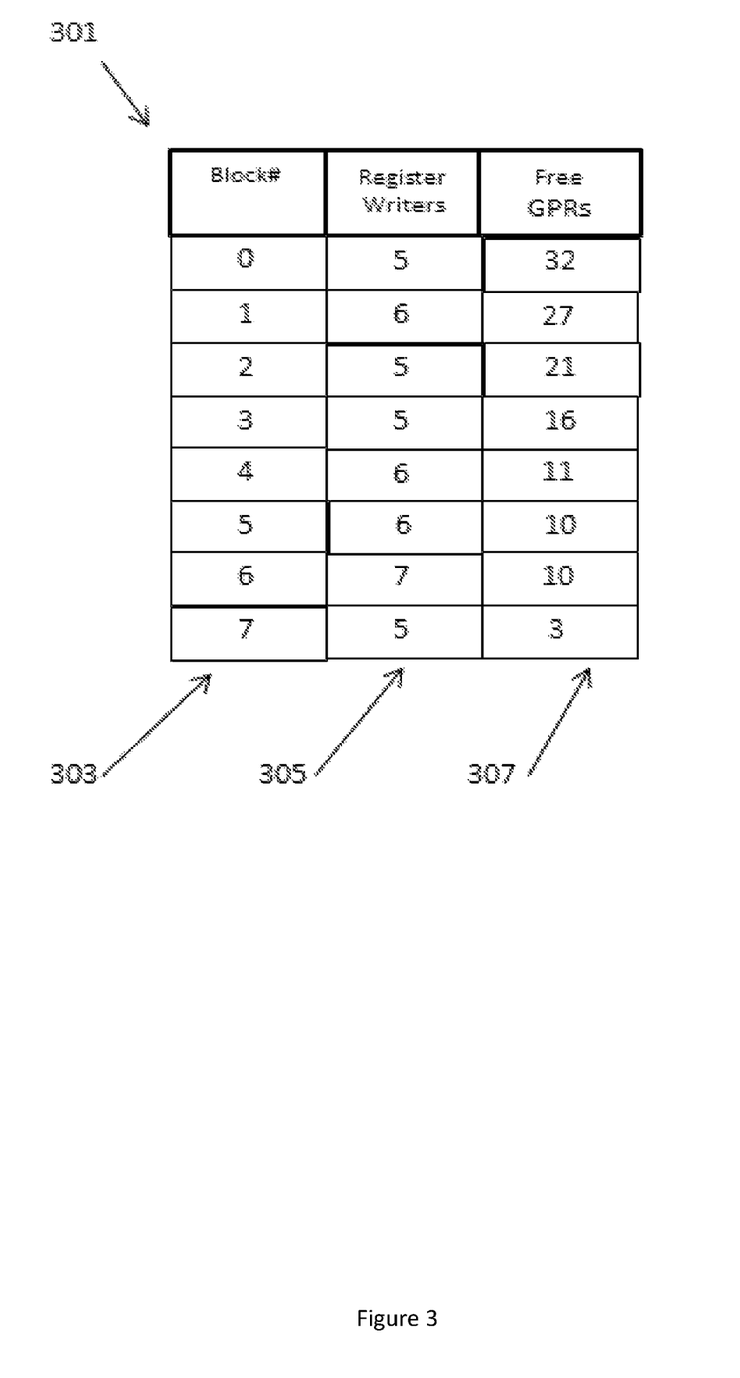
FIG. 3 is a graphic illustration of a table which is used to illustrate a second method of reserving GPR (General Purpose Registers) according to an aspect of the invention.

FIG. 3 is a graphic illustration of a table 301 which is used to illustrate a second method of reserving GPR (General Purpose Registers) according to an aspect of the invention. In FIG. 3 column 303 of table 301 represents the block number of blocks which are exemplarily to be executed. Column 305 of table 301 represents the number of GPR registers (Register Writers) that each corresponding block will need to execute. Column 307 of table 301 represents the number of Free GPRs, i.e., the number of GPRs that are available to the blocks. Block 0 has 5 Register Writers (instructions requiring GPRs). In column 307 there are 32 GPRs available to block 0, so it may proceed. Block 1 will require 6 GPRs and column 307 indicates that 27 GPRs are free, so it may proceed. Similarly blocks 2, 3, 4, 5, 6 can proceed. Block 7 however has only 3 GPRs available to it and cannot proceed until more resources (two more GPRs) are available. So for example, if block 3 were to complete (its execution) then its 5 GPRs would no longer be needed and could be added to the free register count (Free GPRs) bringing the free register count to 8 and at that point block 7 could proceed as 8 GPRs would be available. Once block 7 proceeds only 3 GPRs will be available, until another block completes and its GPRs are no longer needed and may be used to increment the count of Free GPRs.

Those skilled in the art will readily appreciate that the table 301 illustrated in FIG. 3 is for expositive purposes only, and the number of Free GPRs do not need to be tracked as shown, for example the number of Free GPRs can be a counter that is incremented and decremented as described above.

Figure 4:
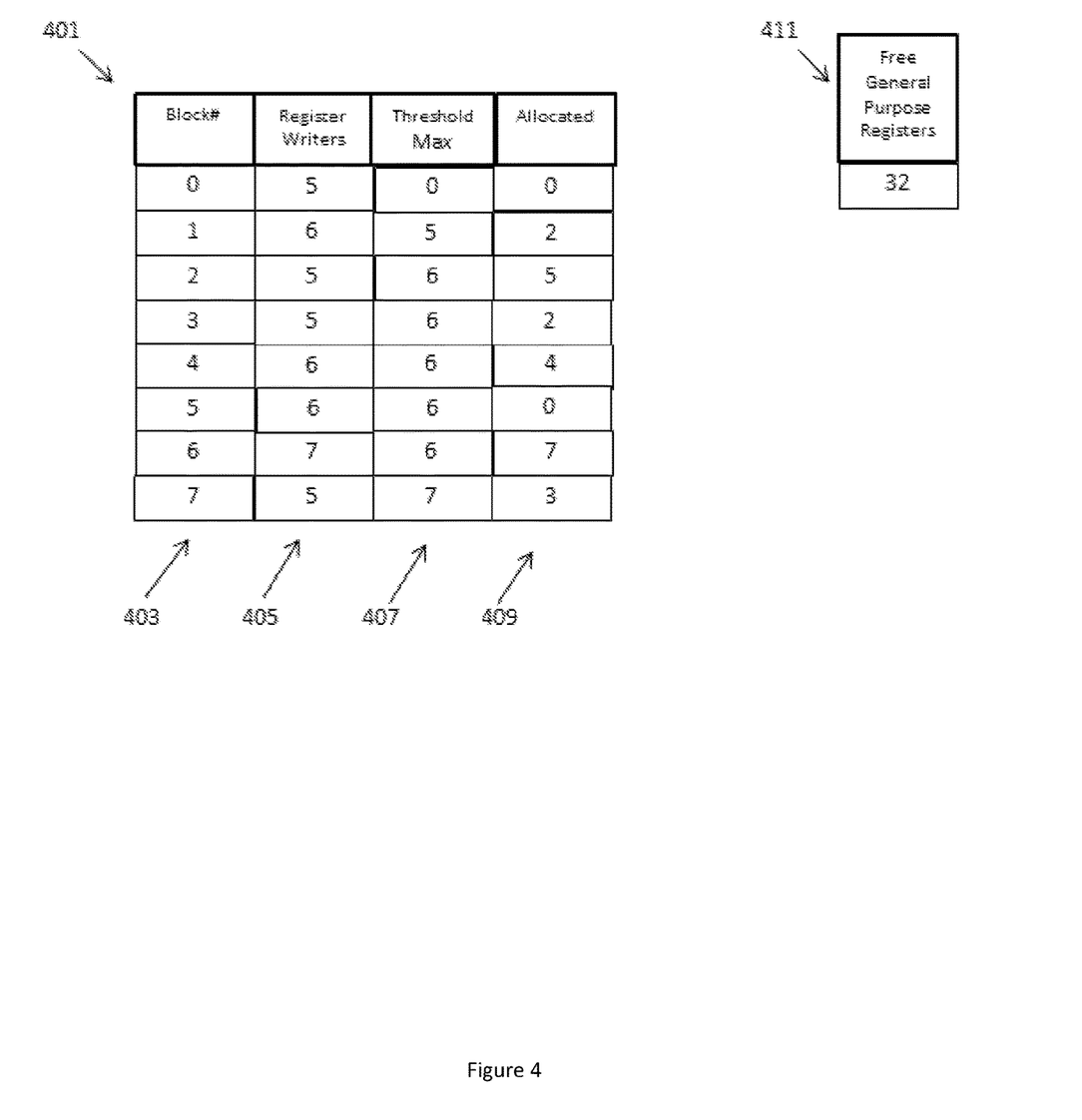
FIG. 4 is a graphic illustration of a table which is used to illustrate a third method of reserving GPR (General Purpose Registers) according to an aspect of the invention.

FIG. 4 is a graphic illustration of a table 401 which is used to illustrate a third method of reserving GPR (General Purpose Registers) according to an aspect of the invention. In FIG. 4 column 403 of table 401 lists the blocks of code to be executed. In Column 405 the number of Register Writers in each block is listed next to each block. The next column 407 is the Threshold Max which is different than the Threshold of the previous examples. The Threshold Max is the maximum Threshold of all the older blocks in the system. Assume, for the sake of illustration, that the oldest block is the block with the lowest block number. Accordingly block 0 is the oldest block, therefore there are no older blocks and the Threshold Max is 0 as illustrated in column 407. Block 1 has one older block than block 0 which has 5 Register Writers and accordingly the Threshold Max is 5. Similarly the Threshold Max is as illustrated in table 401 for blocks 2 through 7. Column 409 is the number of GPRs that have been Allocated to each block, that is GPRs that the block is actually using. When a block needs to use a register it will record the use of the register by adding it to the corresponding sum in the Allocated column 409, which is the actual number of GPRs in use by each block. When a block attempts to use a register (i.e., allocate it to itself) the Threshold Max is examined. In order to allocate an additional GPR register, the Threshold Max (the maximum number of GPRs needed by older instructions) plus 1 (the additional GPR register the block wishes to allocate to itself) must equal or exceed the number of Free GPRs present. If the (Threshold Max+1) is equal or greater than the number of Free GPRs then the additional GPR can be allocated, the block can proceed, and the number of Free GPRs will be decremented. If the Threshold Max+1 is not equal or greater than the number of Free GPRs the block must wait until the condition is satisfied and is put on hold. However if the block wishing to allocate another GPR to itself has a number of Register Writers equal to the Threshold Max and all the blocks in the process of execution have a number of Register Writers that is less than the Threshold Max then the block wishing to assign a GPR to itself can assign the GPR to itself if the Threshold Max is equal to the number of Free GPRs.

Additionally GPRs are not released when a block completes as with the illustrative methods one and two above. Instead GPRs are released on an instruction basis, so when an instruction is complete, the associated GPR is released and the Free General Purpose Registers (GPRs) 411 count is incremented. Of course the method of releasing GPRs on an instruction basis may be employed with any of the methods. However releasing GPRs on an instruction basis may require more overhead and which aspects are employed are implementation dependent.

Column 409 is entitled "Allocated". The column Allocated is a count of the number of GPRs actually in use by a block. In this particular example, the number of Free General Purpose Registers (i.e., GPRs) 411 is equal to the total number of GPRs present minus the number of GPRs allocated. In this implementation, the tracking of resources occurs on an instruction basis instead of a block basis.

When a block needs a GPR register the system must determine that there not only is a register available, but may attempt to assure that there are enough GPRs to support the blocks of code that are in the process of executing. So in addition to determining that there is a GPR available for the instruction that needs one, the system may determine that there are enough GPRs to support the block that needs the most GPRs to execute (i.e., Threshold Max). So if there is a GPR available plus the Threshold Max number of GPRs (to support the presently executing block having the most Register Writers) a GPR may be allocated to the block. If a GPR is allocated, the number of GPRs Allocated 409 is incremented and the number of Free GPRs is decremented. If there are less GPRs available than the Threshold Max plus one, a GPR is not allocated to the block, and the block will not be allowed to execute and will be in a "Hold" condition until enough resources are available.

When an instruction in a block is through with a register, the number of GPRs Allocated will be decremented, and the number of Free GPRs will be incremented. When the number of Free GPRs is increased the blocks on Hold may be examined to see if any of them may be allowed to run.

Using an instruction basis may be viewed as a more aggressive policy of resource management; however those skilled in the art will recognize that different aspects of the present disclosures may be used in concert with aspects of other methods without departing from the substance and spirit of the inventive concepts herein.

Figure 5:
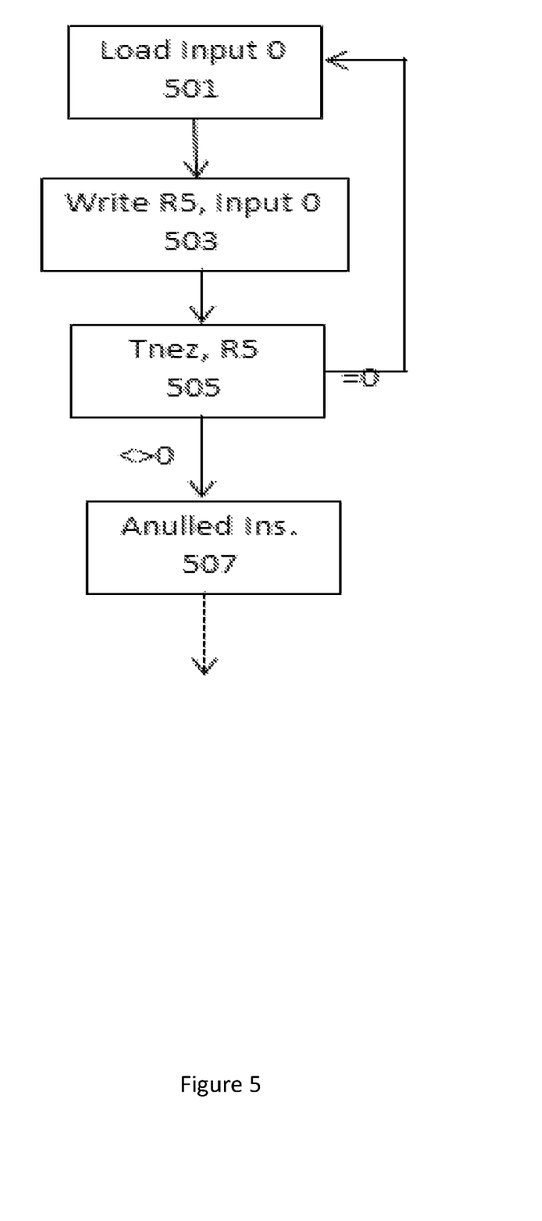
FIG. 5 is a flow chart depicting a portion of computer code that illustrates an aspect of the present disclosure regarding annulled instructions.

FIG. 5 is a flow chart depicting a portion of computer code that illustrates an aspect of the present disclosure regarding annulled instructions. In FIG. 5, block 501 loads a value from input 0. Next in block 503 the value read from input 0 is written into GPR R5. Next in block 505 the contents of register R5 are tested to see if the value is not equal to 0. If the value is equal to 0, control is transferred to block 501. If the contents of R5 are not equal to 0, then control is transferred to block 507. Block 507 is an annulled instruction that basically does nothing, but can be used to provide a signal that the 501, 503, 505 loop is being exited, and that R5 will no longer be in use and hence the free register count can be incremented.

Figure 6:
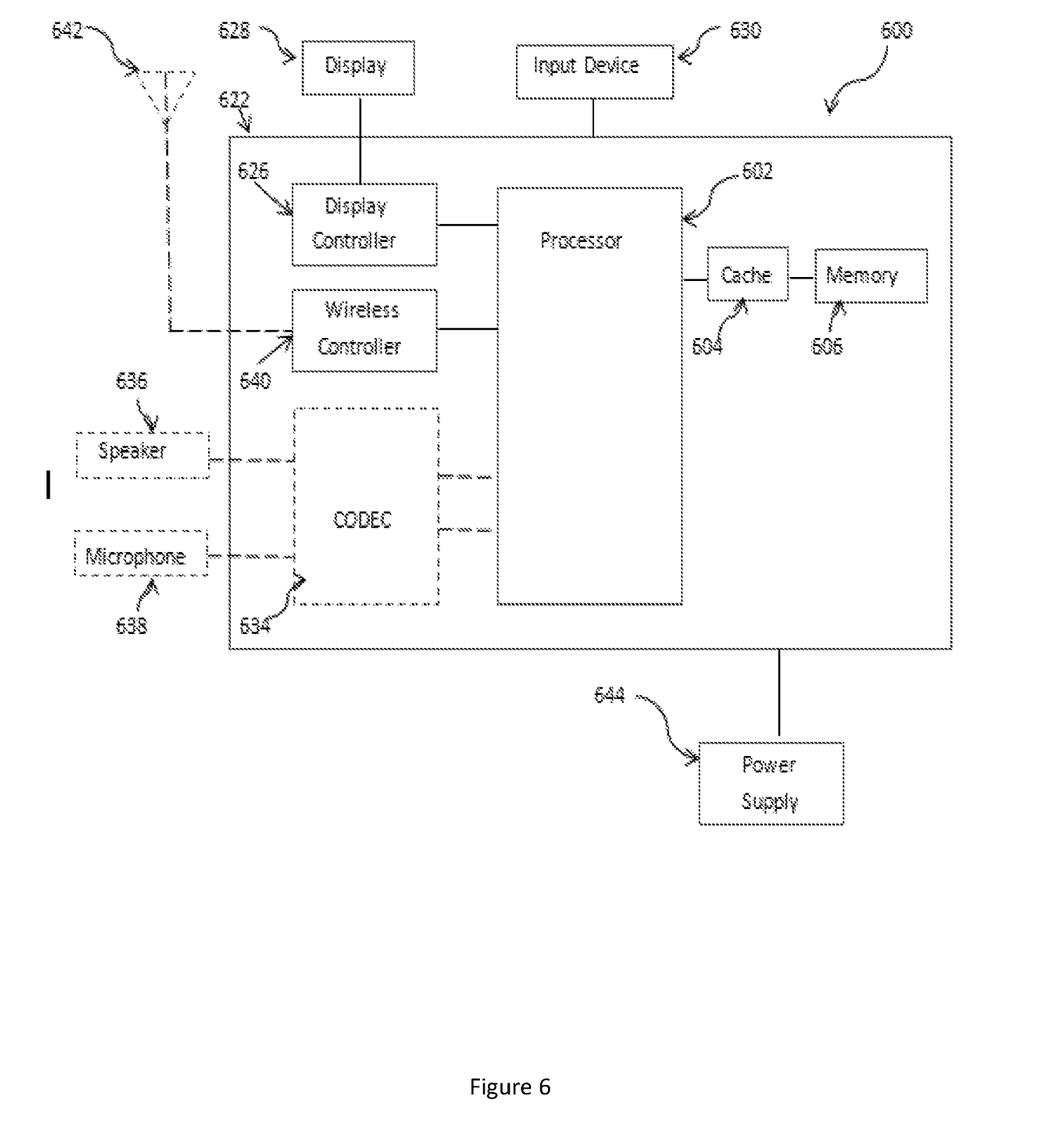
FIG. 6 is a graphic illustration of an exemplary computing device in which aspects of the disclosure may be advantageously employed.

FIG. 6 is a graphic illustration of an exemplary computing device 600 in which an aspect of the disclosure may be advantageously employed. In FIG. 6, processor 602 is exemplarily shown to be coupled to memory 606 with cache 604 disposed between processor 602 and memory 606, but it will be understood that other configurations known in the art may also be supported by computing device 600. FIG. 6 also shows display controller 626 that is coupled to processor 602 and to display 628. In some cases, computing device 600 may be used for wireless communication and FIG. 6 also shows optional blocks in dashed lines, such as coder/decoder (CODEC) 634 (e.g., an audio and/or voice CODEC) coupled to processor 602 and speaker 636 and microphone 638 can be coupled to CODEC 634; and wireless antenna 642 coupled to wireless controller 640 which is coupled to processor 602. Where one or more of these optional blocks are present, in a particular aspect, processor 602, display controller 626, memory 606, and wireless controller 640 are included in a system-in-package or system-on-chip device 622.

Accordingly, in a particular aspect, input device 630 and power supply 644 are coupled to the system-on-chip device 622. Moreover, in a particular aspect, as illustrated in FIG. 6, where one or more optional blocks are present, display 628, input device 630, speaker 636, microphone 638, wireless antenna 642, and power supply 644 are external to the system-on-chip device 622. However, each of display 628, input device 630, speaker 636, microphone 638, wireless antenna 642, and power supply 644 can be coupled to a component of the system-on-chip device 622, such as an interface or a controller.

It should be noted that although FIG. 6 generally depicts a computing device 600, processor 602 and memory 606, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, GPRs, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for managing allocation of a cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of allocating General Purpose Registers in a computer having a block architecture, the method comprising:

determining a number of Register Writers in a block of code (block);
determining a value of a Threshold counter (Threshold), wherein the Threshold is the number of Register Writers in all blocks of code which are in the process of running plus the number of Register Writers to be written by the block of code;
comparing the Threshold to a number representing a Number of General Purpose Registers (#GPRs);
determining that the Threshold is equal to or less than the #GPRs which are not allocated and;
marking the block of code as ready to execute.

2. The method of claim 1, wherein the determining that the block of code is ready to execute further comprises:
determining that the Threshold is greater than the #GPRs which are not allocated; and
marking the block as not ready to execute.

3. The method of claim 1, further comprising:
determining that a block, which had been executing, has completed execution; and
decrementing the Threshold by an amount equal to the number of Register Writers of the block of code which had been executing.

4. The method of claim 3 wherein decrementing the Threshold by the amount equal to the number of Register Writers of the block of code which had been executing further comprises:
checking to see if there is a block of code ready to execute except for not having enough Free GPRs;
determining that the decremented Threshold is equal to or less than the number of Free GPRs; and
allowing the block of code ready to execute except for not having enough Free GPRs to execute.

5. A method of allocating a General Purpose Register (GPR) in a computer having a block architecture, the method comprising:
calculating a Threshold Max for a Block requesting a GPR by setting the Threshold Max equal to the maximum number of Register Writers of all blocks older than the block requesting the GPR;
determining that a number of Free General Purpose Registers (GPRs) is greater than or equal to the Threshold Max plus one; and
allocating the GPR to the Block requesting the GPR.

6. The method of claim 5 further comprising:
decreasing the Threshold Max to the maximum number of Register Writers of all the blocks in the process of executing when the maximum number of Register Writers of all the blocks, which are in the process of executing, decreases.

7. The method of claim 5, further comprising:
increasing the number of Free GPRs when an instruction using the GPRs has completed the use of the GPRs.

8. The method of claim 7, further comprising:
determining that the number of Free GPRs has increased;
determining that
the number of Free GPRs is greater than the Threshold Max of a block; and
allowing the block to execute.

9. The method of claim 8 further comprising:
incrementing the number of allocated GPRs; and
decrementing the number of Free GPRs.

10. The method of claim 5 further comprising:
determining, when a block needs to write to a GPR which it has not written to previously, that there are a number of Free GPRs equal to the Threshold Max plus one; and
allowing that block-to write to the GPR.

11. The method of claim 5 further comprising:
determining, when a block needs to write to a GPR which it has not written to previously that there are a number of Free GPRs less than the Threshold Max plus one; and
marking the block as not ready to execute.

12. The method of claim 5 further comprising:
detecting an annulled instruction in a control divergence having a first and a second divergence, where the annulled instruction is found in a branch of a first control divergence not utilizing a GPR;
having a second divergence which does write to a GPR; and
decreasing the number of Register Writers for a corresponding block when the annulled instruction is executed.

13. The method of claim 5 further comprising:
determining, a block has completed executing,
determining that the number of Register Writers are equal to the Threshold Max;
determining the maximum number of Register Writers in blocks which have not completed executing;
determining that the maximum number of Register Writers is less than the Threshold Max; and
setting Threshold Max equal to the maximum number of Register Writers.

* * * * *